United States Patent [19]
Weiss

[11] Patent Number: 5,015,149
[45] Date of Patent: May 14, 1991

[54] APPARATUS FOR MOVING INSERTERS FOR WORKPIECES

[76] Inventor: Dieter Weiss, Danziger Str. 6, D-6967 Buchen, Fed. Rep. of Germany

[21] Appl. No.: 392,667

[22] Filed: Aug. 11, 1989

[30] Foreign Application Priority Data

Aug. 12, 1988 [DE] Fed. Rep. of Germany ... 8810248[U]

[51] Int. Cl.$^5$ ............................................. B65G 65/00
[52] U.S. Cl. ........................................ 414/751; 74/57; 74/89.17
[58] Field of Search ................ 414/751, 752, 753; 74/89.17, 104, 569, 57

[56] References Cited

U.S. PATENT DOCUMENTS

| | | | |
|---|---|---|---|
| 3,865,253 | 2/1975 | Healy | 414/751 X |
| 4,373,840 | 2/1983 | Miller, Jr. | 414/751 X |
| 4,619,151 | 10/1986 | Trachman et al. | 74/89.17 X |
| 4,693,128 | 9/1987 | Plow | 74/104 |

FOREIGN PATENT DOCUMENTS

2742103 8/1980 Fed. Rep. of Germany.

*Primary Examiner*—Robert J. Spar
*Assistant Examiner*—Donald W. Underwood
*Attorney, Agent, or Firm*—Peter K. Kontler

[57] ABSTRACT

An apparatus for moving the gripper of an inserter for workpieces in a machine tool has a rotor with an endless first cam in its peripheral surface and a second cam in one of its end faces. A carriage which is reciprocable in parallelism with the axis of the rotor receives motion from the first cam by way of a reciprocable toothed rack, a gear segment which is turnable by the rack, and a lever which is coupled to a slide on the carriage. The latter mounts a place-like support for the gripper in such a way that the support is movable at right angles to the direction of reciprocation of the carriage. The support receives motion from the second cam by way of a turnable guide member for the carriage and a lever which extends into a groove of the support. The support moves transversely of the direction of reciprocation of the carriage when the rotor is driven by a motor. Each revolution of the rotor entails a back-and-forth movement of the carriage with the support and a back-and-forth movement of the support relative to the carriage.

23 Claims, 7 Drawing Sheets

APPARATUS FOR MOVING INSERTERS FOR WORKPIECES

BACKGROUND OF THE INVENTION

The invention relates to apparatus for moving objects, such as grippers of inserters for workpieces, between predetermined positions. More particularly, the invention relates to improvements in apparatus for moving grippers or other objects between two spaced apart positions along a composite path in a plurality of mutually inclined directions.

Grippers which can be moved in the apparatus of the present invention can be used to accept individually supplied workpieces and to move the thus supplied workpieces to a predetermined delivery position for acceptance by a work holder or the like, e.g., in a machine tool.

Apparatus for moving grippers of inserters for workpieces or the like are disclosed, for example, in German Auslegeschrift No. 27 42 103. This publication discloses an apparatus wherein a carriage is movable up and down along vertical guide rails. The carriage supports a first end portion of a supporting rod which is movable longitudinally in a horizontal direction and the free second end portion of which carries a gripper holding device. The rod is movable forwardly and backwards by a lever one end of which is coupled to the rod and the other end of which is connected to the housing of the apparatus. A median portion of the lever carries a roller which tracks a cam of a rotary drum-shaped cam holder.

A drawback of the just discussed conventional apparatus is that it cannot move the gripper between its end positions with a requisite degree of accuracy and reproducibility. This is believed to be attributable to the utilization of link trains wherein errors due to manufacturing tolerances and/or wear are multiplied to thus cause pronounced departures of actual positions of the gripper from its desired or optimum positions. Moreover, various movements must take place in a very rapid sequence.

OBJECTS OF THE INVENTION

An object of the invention is to provide an apparatus wherein the masses which must be displaced in order to move an object holding device between predetermined positions are small and which is assembled from a relatively small number of simple components.

Another object of the invention is to provide the apparatus with novel and improved means for moving an object supporting or holding device in a plurality of mutually inclined directions with a high degree of accuracy and reproducibility, e.g., to move an inserter to and from a delivery position in which the gripper of such inserter can deliver a pin-shaped portion of or an entire pin-shaped workpiece into a hole or socket.

A further object of the invention is to provide the apparatus with novel and improved means and arrangements for transmitting motion from one or more cams to parts which, in turn, serve to move the object supporting device, such as a plate-like support for the gripper of an inserter of workpieces or other objects.

An additional object of the invention is to provide a novel and improved method of transporting objects along a composite path between spaced-apart first and second positions.

Still another object of the invention is to provide the apparatus with novel and improved means for converting reciprocatory movements of motion transmitting parts into angular movements of motion receiving parts and vice versa.

An additional object of the invention is to provide the apparatus with a novel and improved rotor-shaped system of cams.

SUMMARY OF THE INVENTION

The invention is embodied in an apparatus for moving an object, such as the gripper of an inserter of workpieces, between two positions in a first direction and in a second direction substantially at right angles to the first direction. The improved apparatus comprises first guide means extending in the first direction, a carriage which is reciprocable along the first guide means, second guide means provided on the carriage and extending in the second direction, an object supporting device which is movable along the second guide means, means for reciprocating the carriage along the first guide means, and means for moving the object supporting device along the second guide means. The reciprocating means comprises a rotor, first cam means on the rotor, and means for transmitting motion from the first cam means to the carriage. The moving means comprises second cam means on the rotor and an arrangement for transmitting motion between the second cam means and the object supporting device.

The first cam means can include an endless cam (particularly a cam having an endless groove in the peripheral surface of the rotor), and the motion transmitting means of the reciprocating means can include a toothed rack which is reciprocable in the first direction and has a follower tracking the endless cam, a gear which mates with the rack and is rotatable about an axis extending at right angles to the first and second directions, and a lever which is rigid with the gear and is coupled to the carriage to move the carriage along the first guide means in response to rotation of the gear by the rack. The endless cam is preferably configurated to rotate the gear by way of the rack through substantially 180° clockwise and counterclockwise in response to each revolution of the rotor and to thereby pivot the lever between two end positions in each of which the lever is parallel to the first direction. The motion transmitting means can further comprise a slide which is movable with reference to the carriage in the second direction and is connected to and is reciprocable by the lever.

The first direction is or can be substantially horizontal, and the second direction is or can be substantially vertical.

The apparatus can further comprise means for rotating the rotor about an axis which is parallel with the first direction.

The first guide means can include an elongated guide member rotatable about an axis which extends in the first direction and forming part of the motion transmitting arrangement. Such guide member includes follower means tracking the second cam means which is preferably configurated in such a way that the guide member turns back and forth through less than 180° in response to each revolution of the rotor. Such motion transmitting arrangement preferably further comprises an arm which extends substantially radially of and is movable along the guide member in the first direction. The arm is coupled to the object supporting device in order to move such device along the second guide means in response to turning of the guide member. The object supporting device can be provided with a track which extends in the second direction, and the arm on the guide member then includes a portion which engages and is movable along the track. The track can be provided with a groove, and the portion of the arm preferably extends into the groove with a certain amount of clearance. A spring or other suitable biasing means is provided to bias the object supporting device against the arm.

The second cam means can be provided in an end face of the rotor. Such second cam means can include a surface which surrounds a recess in the end face of the rotor, and the apparatus can further comprise means (such as a coil spring) for yieldably biasing the follower means of the turnable guide member against the surface surrounding the recess in the end face of the rotor. The motion transmitting arrangement of this apparatus can comprise a forked arm which is turnable with and is movable along the guide member in the first direction. The object supporting device has a projection (e.g., a pin or stud) which is straddled by the prongs of the lever.

The apparatus further comprises a housing for the carriage, and the housing includes a wall provided with a window through which a portion of the carriage extends. The object supporting device is disposed outside of the housing adjacent the outwardly projecting portion of the carriage. The window preferably receives the aforementioned portion of the carriage with a certain clearance, and the apparatus further comprises means for sealing the clearance to thus seal the interior of the housing from the surrounding atmosphere. The sealing means can comprise one or more bellows each of which is affixed to the housing and to the carriage.

The aforementioned wall which is provided with the window and forms part of the housing is or can be at least substantially parallel with a plate which forms part of or constitutes the object supporting device.

The motion transmitting arrangement between the second cam means and the object supporting device can include the aforementioned elongated guide member which forms part of the first guide means and is turnable in the housing about an axis extending in parallelism with the first direction in response to rotation of the rotor. The apparatus can further comprise a plurality of limit switches which are adjacent the guide member, and means for actuating the limit switches. The actuating means can include an arm which is turnable with the guide member and can move longitudinally of the guide member when the latter is in the process of being turned by the second cam means in response to rotation of the rotor. The limit switches (at least one of which can include or constitute a pneumatic valve) can serve to transmit signals which are used to move the gripper with reference to the object supporting device in preselected position or positions of the carriage and of the object supporting device thereon.

The means for rotating the rotor can include an electric motor. The rotor can drive a disc for one or more actuators which orbit about the axis of the rotor when the motor is on. At least one signal generating component (particularly a contact-free initiator, also called proximity detector) can be installed adjacent the path of orbital movement of the at least one actuator to generate signals which serve to arrest the motor or to control the movements of the gripper on the object supporting device in lieu of signals from the aforementioned limit switches.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
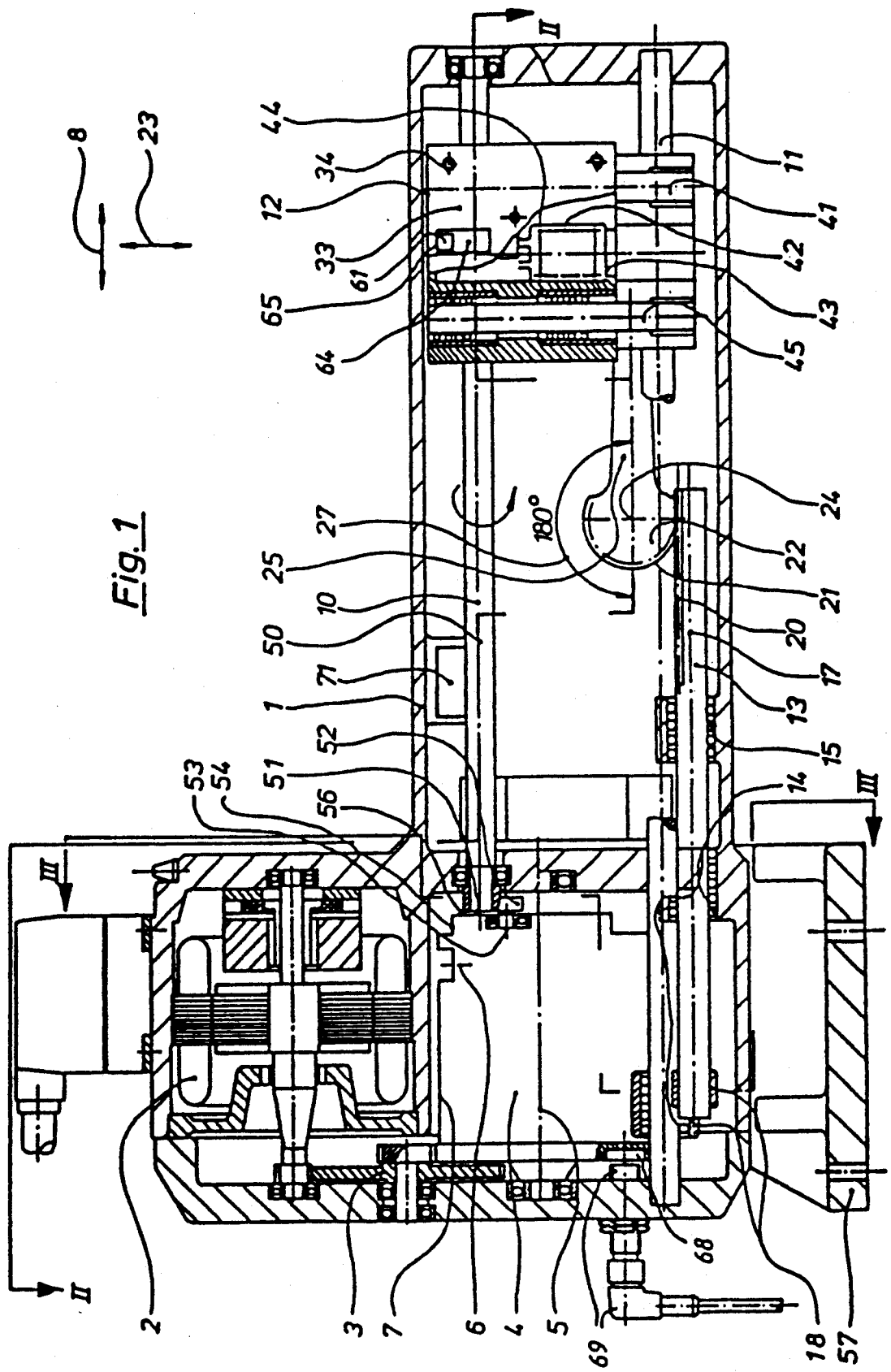
FIG. 1 is a longitudinal sectional view of an apparatus which embodies one form of the invention, the section being taken along the line I—I in FIG. 3.

The apparatus which is shown in FIGS. 1 to 4 comprises a housing or casing 1 including a plate-like base 57 which can be affixed to a suitable support, not shown. The housing 1 confines an electric motor 2 which serves to rotate a drum-shaped rotor 4 through the medium of a gear transmission 3. The rotor 4 is mounted in the housing 1 for rotation about an axis 5 which is parallel to the axis of the output element of the motor 2 and with a first direction of movement of an object, such as the gripper of an inserter of workpieces. The first direction is indicated by a double-headed arrow 8, and the second direction of movement of the object is indicated by a double-headed arrow 23. The first direction (arrow 8) is or can be substantially horizontal, and the second direction (arrow 23) is or can be substantially vertical, i.e., at least substantially at right angles to the first direction.

The peripheral surface 7 of the drum-shaped rotor 4 is provided with an endless first cam 6 which has an endless cam groove for a follower 18.

The apparatus further includes first guide means including two elongated rod-shaped guide members 10, 11 which extend in the first direction (arrow 8) and are mounted in the housing 1 adjacent one axial end of the rotor 4. The guide members 10, 11 define an elongated path for a carriage 12 which is reciprocable in the first direction toward and away from the one axial end of the rotor 4. The means for transmitting motion from the rotor 4 to the carriage 12 (so that the latter is caused to reciprocate along the guide members 10, 11) includes an elongated straight toothed rack 13 the axis 17 of which is parallel with the guide members 10, 11 and one end of which carries the aforementioned follower 18 in the groove of the endless first cam 6. The rack 13 is reciprocable in thrust bearings 14, 15 which are installed in the housing 1. The configuration of the groove of the cam 6 is such that the rack 13 moves back and forth through a predetermined distance between two predetermined end positions in response to each complete revolution of the rotor 4. That end portion of the rack 13 which is remote from the follower 18 has a row of gear teeth 20 mating with the teeth 21 of a gear 22, here shown as a gear segment, mounted in the housing 1 for rotation about an axis 24 which extends at right angles to the directions indicated by the arrows 8 and 23.

The means for transmitting motion from the cam 6 to the carriage 12 further comprises a lever 25 which is rigid with and extends radially of the gear 22. The latter can pivot the lever 25 between two end positions at an angle of 180° relative to each other. The lever 25 is parallel with the first direction (arrow 8) in each of its two end positions. The directions of pivotal movement of the lever 25 about the axis 24 are indicated by a double-headed arrow 27.

Still further, the means for transmitting motion from the cam 6 to the carriage 12 includes a second carriage or slide 30 (hereinafter called slide) which is mounted on the carriage 12 for reciprocatory movement along a further guide member 31 extending in the second direction (arrow 23). The free end portion 32 of the lever 25 is articulately connected with the slide 30. The slide 30 travels along the guide member 31 while the lever 25 pivots about the axis 24, and this causes the carriage 12 to move along the guide members 10, 11 between its two end positions corresponding to the two end positions of the lever 25. Since the two end positions of the carriage 12 (as seen in the direction of arrow 8) correspond to the two end positions of the lever 25 (as seen in the direction of arrow 27), and since the lever 25 is parallel to the first direction (arrow 8) in each of its end positions, the carriage 12 invariably assumes the same first and the same second end position in response to each and every revolution of the rotor 4 and its cam 6. This takes place irrespective of any clearance or play in the motion transmitting means between the cam 6 and the carriage 12.

The carriage 12 movably supports an object supporting device 33 in the form of a substantially rectangular plate disposed in a plane which is parallel to the axis 5 (direction of arrow 8) and to the axis of the guide member 31 (direction of arrow 23). The device 33 (hereinafter called plate) is provided with bores or holes 34 for fasteners which secure to this plate a suitable gripper forming part of an inserter (not shown) of workpieces or the like.

Figure 2:
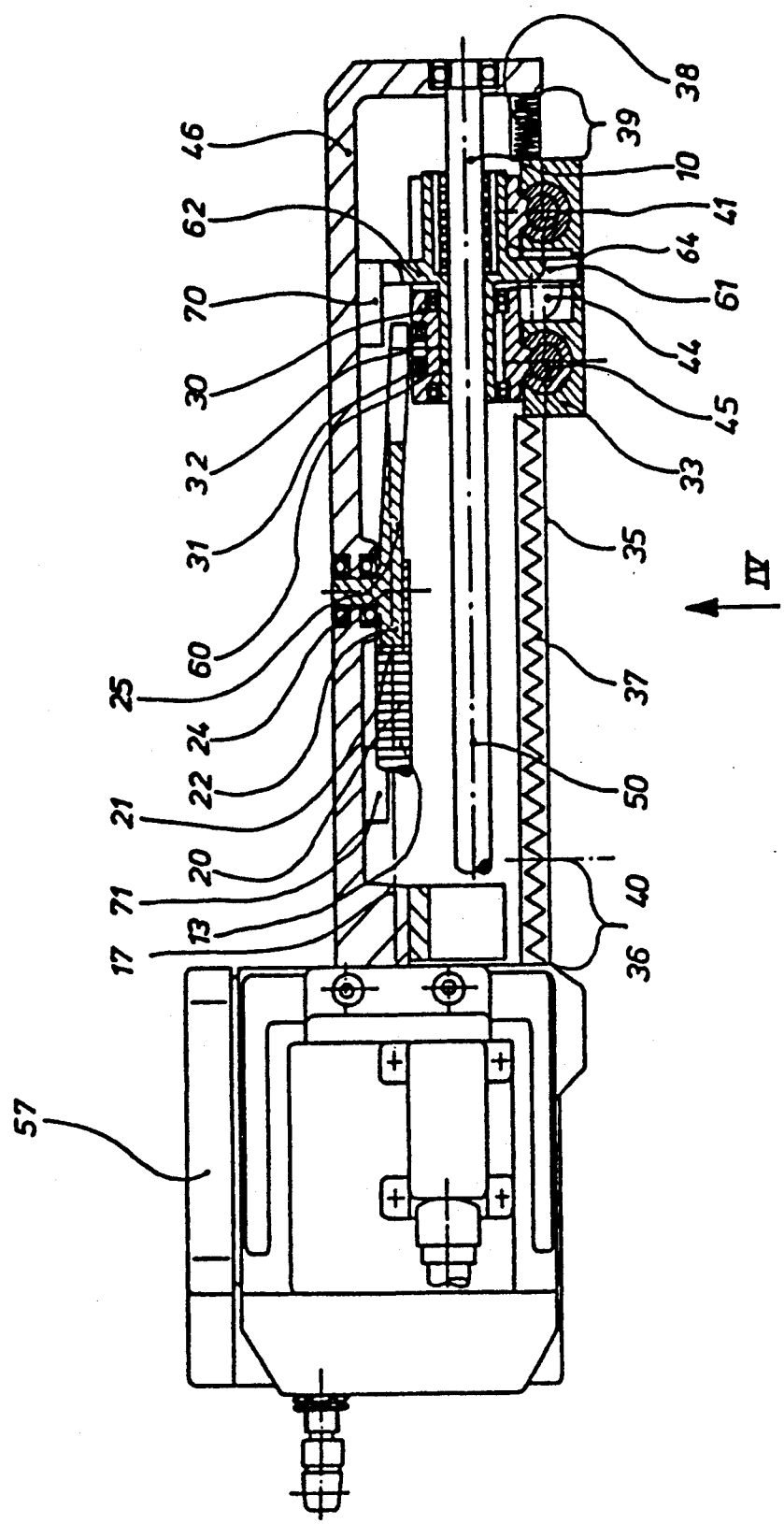
FIG. 2 is a sectional view as seen in the direction of arrows from the line II—II of FIG. 1.
Figure 3:
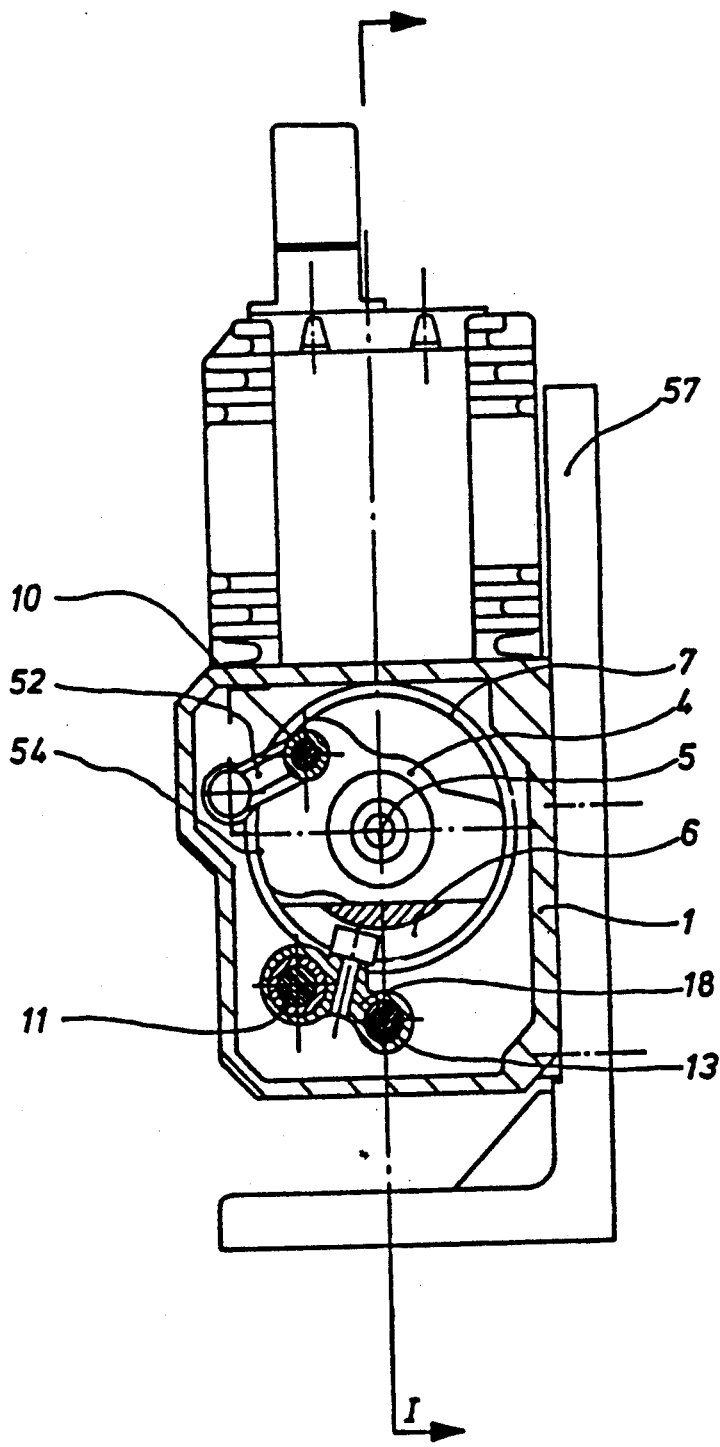
FIG. 3 is a transverse sectional view substantially as seen in the direction of arrows from the line III—III of FIG. 1.
Figure 4:
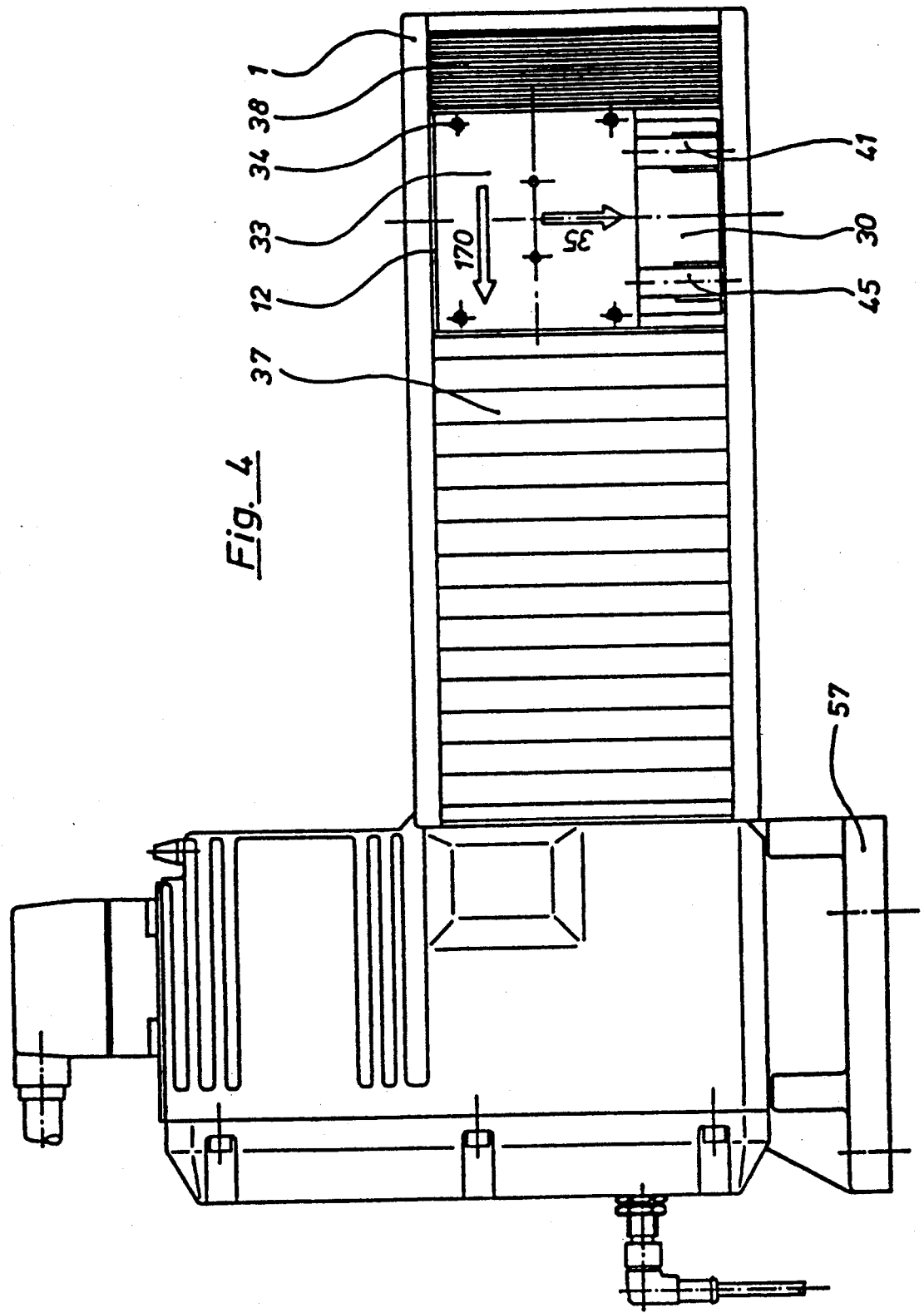
FIG. 4 is an elevational view as seen in the direction of arrow IV in FIG. 2.

FIG. 2 shows that a portion of the carriage 12 extends from the housing 1 and that the plate 33 is adjacent the exposed or accessible portion of the carriage. To this end, the wall 35 of the housing 1 is provided with an opening or window 36 for the outwardly projecting portion of the carriage 12, and the dimensions of the window 36 are such that the carriage is free to move between its two end positions and that the plate 33 is free to move with reference to the carriage. The wall 35 is parallel to the plate 33. Those portions of the window 36 which are not occupied by the carriage 12 are sealed by two bellows 37 and 38. When the carriage 12 is held in the right-hand end position of FIG. 2, the bellows 38 is fully compressed or folded to occupy a relatively narrow portion 39 of the window 36 between the right-hand end wall of the housing 1 and the carriage 12. The other bellows 37 is then fully expanded and seals the major portion of the window 36 between the left-hand end wall of the housing 1 and the carriage 12. When the carriage 12 is moved to its left-hand end position (as seen in FIG. 2), the bellows 37 is fully compressed and seals only the narrow portion 40 of the window 36; at the same time, the bellows 38 is fully expanded and seals the major portion of the window 36. The bellows 37 and 38 can be used in combination with or in lieu of other suitable sealing means to ensure that the parts which are confined in the housing 1 are shielded from dust and/or other foreign matter.

The apparatus further comprises second guide means including two parallel guide rails 41, 45 which are provided on the carriage 12 and extend in the second direction (arrow 23). The plate 33 is reciprocable along the guide rails 41, 45 in the second direction, and the arrangement for transmitting motion from the rotor 4 to the plate 33 (for movement along the guide rails 41, 45) includes the guide member 10 and a second cam 54 which is provided in or at one end face of the rotor 4. When it moves upwardly (as seen in FIG. 1), the plate 33 must overcome the bias of a helical compression spring 42 which reacts against the carriage 12 and urges the plate 33 downwardly. This spring bears against a shoulder 43 of the plate 33 and reacts against a retainer 44 on the carriage 12.

The guide member 10 of the first guide means (including the members 10 and 11) is rotatable about an axis 50 which is parallel with the first direction (arrow 8), i.e., to the axis 5 of the rotor 4. The left-hand end portion 51 of the guide member 10 carries a lever 52 for a follower 53 which tracks the second cam 54 of the rotor 4. The cam 54 is a closed cam and is provided in or at that end face 56 of the rotor 4 which confronts the guide members 10 and 11. The configuration of the cam 54 is such that it causes the rotary guide member 10 to turn about its axis 50 back and forth through an angle of less than 180° (preferably through an angle of approximately 50°) during each full revolution of the rotor 4.

The guide member 10 supports a driving element 60 which shares the angular movements of this guide member and is also movable longitudinally in directions indicated by the arrow 23. This driving element is coupled to the carriage 12 and has two arms 61, 62 which extend radially of the guide member 10 and are disposed diametrically opposite each other with reference to the axis 50. The free end portion of the arm 61 extends into a track including an elongated groove 64 in the plate 33. The groove 64 extends in the second direction (arrow 23) and receives the end portion of the arm 61 with a certain amount of play (see FIG. 1) in the first direction (arrow 8). The spring 42 biases the free end portion of the arm 61 against the plate 33 in such a way that the free end portion bears against the surface 65 bounding the upper end of the groove 64. The free end portion of the arm 61 continues to bear against the surface 65 as long as no external forces are applied to the plate 33.

The second arm 62 of the driving element 60 serves as an actuator for two limit switches 70 and 71 which are adjacent the path of movement of the arm 62 and each of which can include or constitute a pneumatic valve. These switches are adjustably mounted in the housing 1 so that they can generate signals in response to movement of the arm 62 to selected positions with reference to the guide member 10. The purpose of the limit switches 70 and 71 is to generate signals (or to initiate the generation of signals) which are used to operate the gripper on the plate 33. Signals which are generated (or the generation of which is initiated) by the limit switches 70, 71 can be electric, hydraulic, pneumatic or other signals, depending on the design of controls for the gripper.

The reference character 69 denotes in FIG. 1 a contact-free sensor or initiator which is adjacent the endless circular path of movement of an actuating element 68 at the left-hand end face of the rotor 4. The actuating element 68 causes the initiator 69 to generate a signal during each revolution of the rotor 4 about the axis 5. Such signal is used to arrest the motor 2 for the rotor 4 and to thus arrest the plate 33 and its gripper in a predetermined starting position. The next cycle is started in response to starting of the motor 2 in a manner which is not shown and forms no part of the invention. For example, the motor circuit can include an on-off switch which is actuatable by hand or automatically, depending on the nature and complexity of the machine in which the improved apparatus is put to use.

When the apparatus of FIGS. 1 to 4 is to be put to use, the plate 33 and the gripper thereon dwell in the starting position which is determined by the initiator 69. If the motor 2 is started so that the rotor 4 begins to turn about the axis 5, the cam 6 causes the carriage 12 to move outwardly in the first direction (arrow 8) and the cam 54 causes the plate 33 (which shares the movement of the carriage 12) to move relative the carriage in the second direction (for example, downwardly as seen in FIG. 1). As mentioned above, the first direction (arrow 8) is or can be horizontal. The gripper on the plate 33 reaches a predetermined delivery position where the workpiece is delivered at a work processing or treating station or for other purposes before the plate 33 and the carriage 12 start their movement back to the starting position. During return movement, the plate 33 and the carriage 12 retrace their movements from the starting position but in the opposite direction.

The movement of the plate 33 in the second direction toward the operative or delivery position of the gripper (preferably downwardly, as seen in FIG. 1) is cushioned by the spring 42 which is effective because the end portion of the arm 61 extends into the groove 64 of the plate 33 with the aforediscussed clearance.

An advantage of the improved apparatus is that the lever 25 is held in a dead-center position whenever the carriage 12 assumes one of its end positions. This ensures that the carriage 12 is capable of moving the plate 33 to an accurately defined first or second end position as often as necessary without risking misalignment between the gripper on the plate 33 and the parts which deliver workpieces to and/or the parts which receive workpieces from the inserter on the plate 33. Eventual tolerances between the parts of the means for transmitting motion from the cam 6 to the carriage 12 and/or between the parts of the arrangement for transmitting motion between the cam 54 and the plate 33 on the carriage 12 are not compounded and do not affect, or only negligibly affect, the accuracy of positioning of the plate 33 and the gripper thereon in either end position of the plate 33.

Since the guide members 10, 11 are not mounted on the carriage 12, the mass of parts which move in response to rotation of the rotor 4 is relatively small so that the inertia of parts which are set in motion in response to rotation of the rotor 4 is also small which contributes to a reduction of wear and to higher accuracy of positioning of the gripper in each of its end positions.

The mounting of the rotor 4 in such a way that its axis 5 extends in the first direction (arrow 8) contributes to simplicity of the means for transmitting motion from the cam 6 and to simplicity of the arrangement which transmits motion from the cam 54.

The guide member 10 performs a plurality of functions. Thus, this guide member forms part of the first guide means (10+11) which guides the carriage 12 for movement in the first direction, and the guide member 10 forms part of the arrangement which transmits motion from the cam 54 to the plate 33 so that the latter moves relative to the carriage 12 when the motor 2 drives the rotor 4. The provision of such multiple-purpose guide member contributes to simplicity, compactness and lower cost of the improved apparatus because it is not necessary to provide an additional part for transmission of motion from the arm 52 and follower 53 to the arms 61, 62 of the driving element 60.

FIGS. 5 to 8 show a second apparatus wherein all such parts which are identical with or clearly analogous to corresponding parts of the apparatus of FIGS. 1 to 4 are denoted by similar reference characters plus 100. The construction and mode of operation of the second apparatus are identical with those of the first apparatus except in the following respects:

The motor 102 which drives the rotor 104 is mounted externally of the housing 101. This motor drives a toothed pulley 180 which, in turn, drives a second toothed pulley 103 through the medium of an internally toothed belt 181. The pinion 103 is a functional equivalent of the gear 3 and serves to transmit torque to the rotor 104 which is installed in the housing 101 to rotate about the axis 105. The transmission including the pulleys 180, 103 and belt 181 exhibits the advantage that it requires less maintenance (no lubrication) than a gear train.

The rotor 104 rotates with a coaxial disc-shaped carrier 182 of actuators 168, 184 in the form of holes, markers or the like. These actuators serve to initiate the generation of signals by contact-free sensors or initiators 169 and 185. These initiators are adjacent the endless circular paths of movement of the actuators 168, 184. Signals which are generated by the initiator 169 are used to control the operation of the motor 102, i.e., to arrest the motor 102 when the rotor 104 completes a full revolution. Signals which are generated by the initiator 185 are used to control the operation of the gripper on the plate 133, i.e, such signals replace those which are generated by the limit switches 70, 71 in the apparatus of FIGS. 1 to 4.

Figure 5:
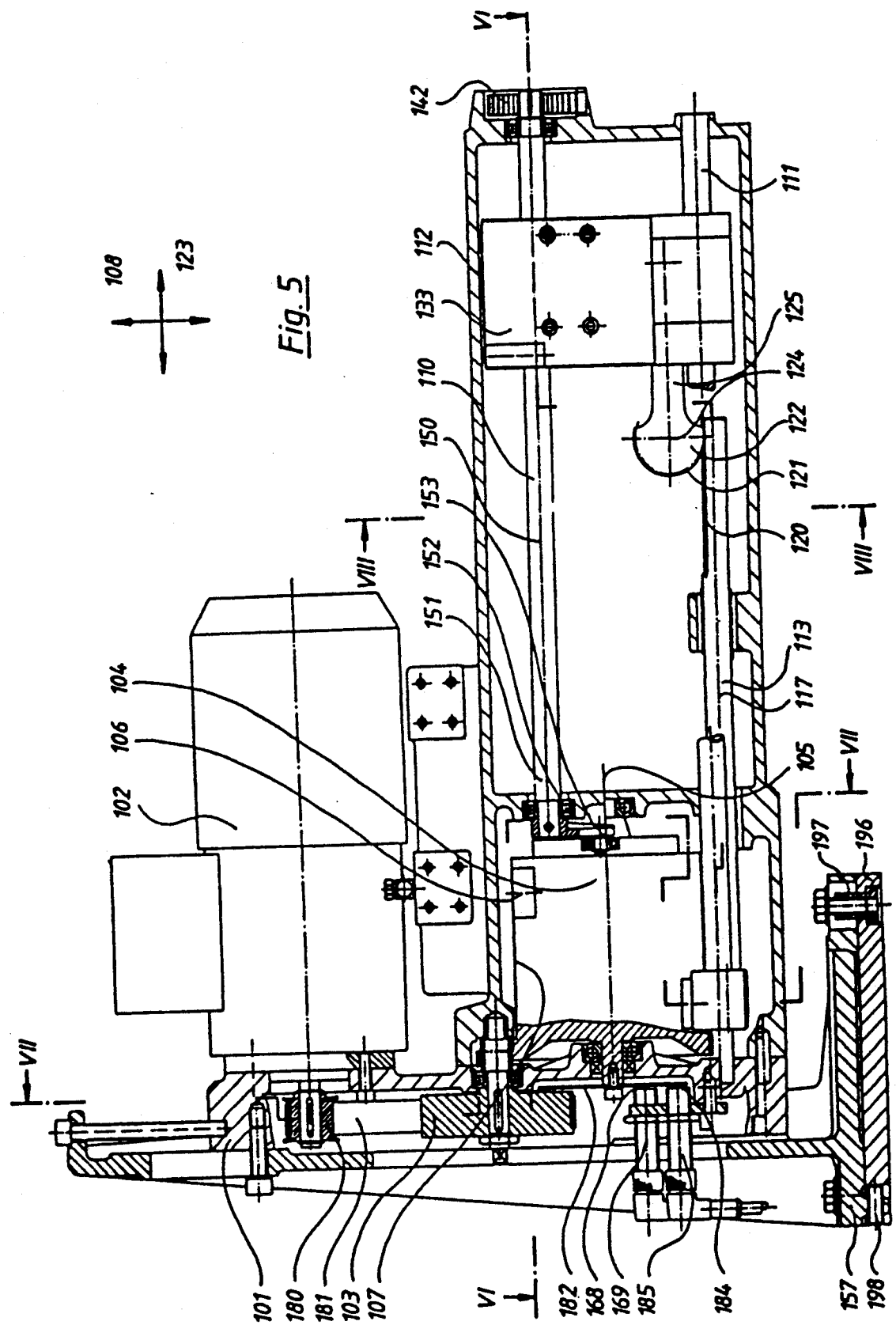
FIG. 5 is a longitudinal sectional view of a second apparatus.
Figure 6:
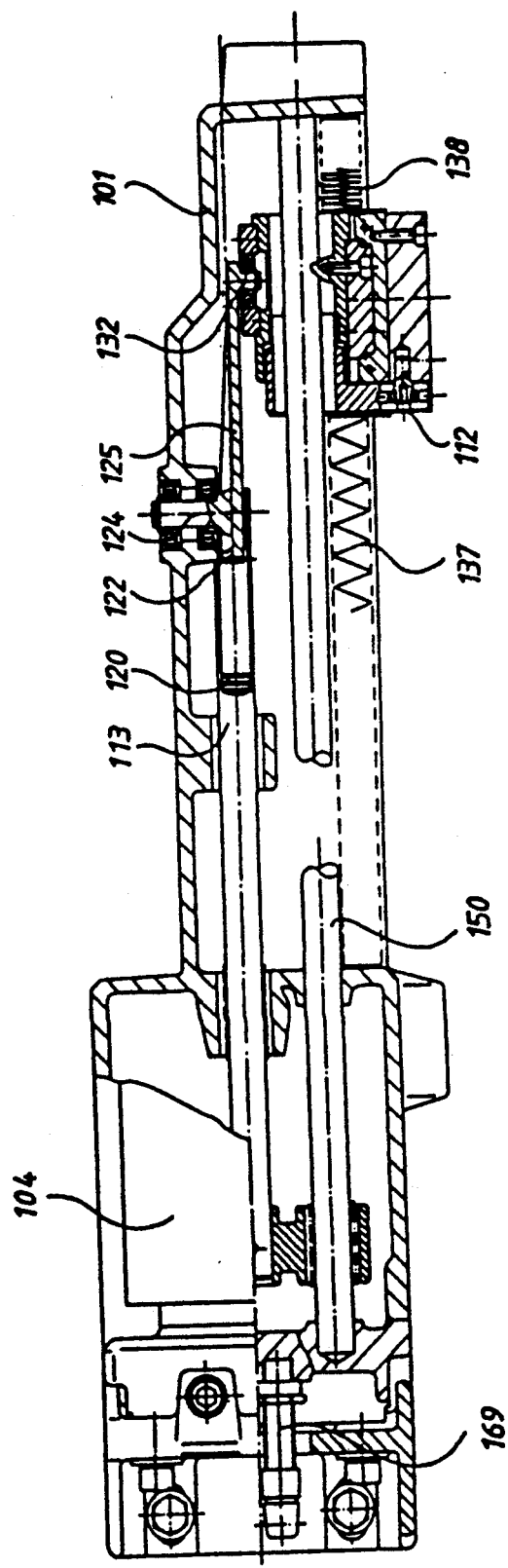
FIG. 6 is a sectional view as seen in the direction of arrows from the line VI—VI of FIG. 5.
Figure 8:
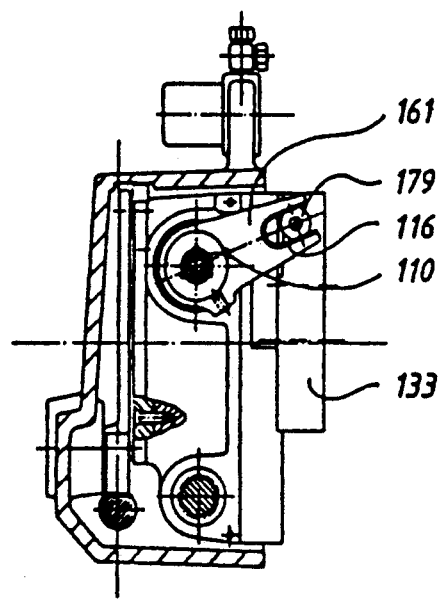
FIG. 8 is a transverse sectional view as seen in the direction of arrows from the line VIII—VIII of FIG. 5.
Figure 7:
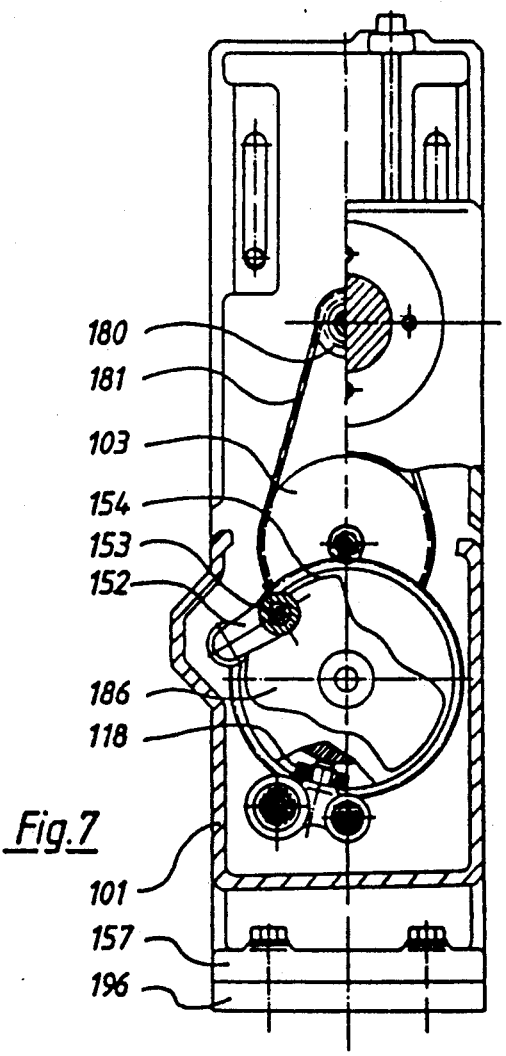
FIG. 7 is a transverse sectional view as seen in the direction of arrows from the line VII—VII of FIG. 5.

FIG. 7 shows that the second cam 154 at the respective end face of the rotor 104 is provided in a recess 186 of the rotor and is tracked by the follower 153 on the arm 152 which is non-rotatably mounted on the turnable guide member 110. The cam 154 is constituted by the surface which surrounds the recess 186 of the rotor 104, and the follower 153 is biased against such surface by the spring 142. The follower 153 can move away from the surface of the cam 154 by overcoming the bias of the spring 142. The latter cushions the movement of the plate 133 to its delivery position, namely in a downward direction as seen in FIG. 5.

The arm 161 of the driving element which is used in the apparatus of FIGS. 5 to 8 is bifurcated (see FIG. 8) and its prongs 116 straddle a projection 179 in the form of a stud or pin which is parallel to the guide member 110. The arm 161 is slidable along but shares the angular movements of the guide member 110. The projection 179 is mounted on the plate 133. This ensures that the plate 133 is compelled to move in the second direction (arrow 123) in response to turning of the guide member 110 under the action of the second cam 154.

The plate-like base 157 of the housing 101 is adjustably secured to an assembly plate 196 which, in turn, is fixedly secured to a suitable support, not shown, by means of screws, bolts or other fastener means. The base 157 is adjustable with reference to the assembly plate 196 in two directions at right angles to each other. The means for fixing the base 157 to the assembly plate 196 in a selected position includes tapped sleeves 197 in the plate 196 and externally threaded members (e.g., bolts) with heads which overlie the base 157 and mesh with the respective sleeves 197. The sleeves 197 are disposed at the corners of a rectangle. Two threaded adjusting members 198 (only one shown) are provided to facilitate adjustment of the position of the base 157 relative to the assembly plate 196 prior to tightening of bolts which mesh with the sleeves 197.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for moving an object, such as the gripper of an inserter for workpieces, between two positions in a first direction and in a second direction substantially at right angles to the first direction, comprising first guide means extending in said first direction; a carriage reciprocable along said guide means; second guide means provided on said carriage and extending in said second direction; an object supporting device movable along said second guide means; means for reciprocating said carriage along said first guide means, including a rotor, first cam means including an endless cam on said rotor, and means for transmitting motion from said first cam means to said carriage including a toothed rack reciprocable in said first direction and having a follower tracking said endless cam, a gear mating with said rack and being rotatable about an axis which is normal to said first and second directions, and a lever rigid with said gear and coupled to said carriage to move said carriage along said first guide means in response to rotation of said gear by said rack; and means for moving said device back and forth along said second guide means, including second cam means provided on said rotor, and means for transmitting motion between said second cam means and said device.

2. The apparatus of claim 1, wherein said endless cam is configured to rotate said gear by way of said rack through substantially 180° clockwise and counterclockwise in response to each revolution of said rotor and to thus pivot said lever between two end positions in each of which said lever is parallel to said first direction.

3. The apparatus of claim 2, wherein said means for transmitting motion from said first cam means to said carriage further comprises a slide movable with reference to said carriage in said second direction and connected to and reciprocable by said lever.

4. The apparatus of claim 1, wherein said first direction is substantially horizontal.

5. The apparatus of claim 1, wherein said second direction is substantially vertical.

6. The apparatus of claim 1, further comprising means for rotating said rotor about an axis which extends in said first direction.

7. Apparatus for moving an object, such as the gripper of an inserter for workpieces, between two positions in a first direction and in a second direction substantially at right angles to the first direction, comprising first guide means extending in said first direction and including an elongated guide member rotatable about an axis which extends in said first direction; a carriage reciprocable along said guide means; second guide means provided on said carriage and extending in said second direction; an object supporting device movable along said second guide means; means for reciprocating said carriage along said first guide means, including a rotor, first cam means provided on said rotor, and means for transmitting motion from said first cam means to said carriage; and means for moving said device back and fourth along said second guide means, including second cam means provided on said rotor, and means for transmitting motion between said second cam means and said device, said guide member forming part of said means for transmitting motion between said second cam means and said device.

8. The apparatus of claim 7, wherein said guide member includes follower means tracking said second cam means, said second cam means being configured to turn said guide member back and forth through less than 180° in response to each revolution of said rotor.

9. The apparatus of claim 8, wherein said means for transmitting motion between said second cam means and said device further comprises an arm extending substantially radially of and movable along said guide member in the first direction, said arm being coupled to said device to move said device along said second guide means in response to turning of said guide member.

10. The apparatus of claim 9, wherein said device has a track extending in said second direction and said arm has a portion engaging and movable along said track.

11. The apparatus of claim 10, wherein said track has a groove and said portion of said arm extends into said groove with a predetermined clearance.

12. The apparatus of claim 11, further comprising means for biasing said device against said portion of said arm.

13. The apparatus of claim 8, wherein rotor has an end face and said second cam means is provided in said end face and includes a surface bounding a recess in said end face, and further comprising means for yieldably biasing said follower against said surface.

14. The apparatus of claim 13, wherein said means for transmitting motion between said second cam means and said device further comprises a forked arm turnable with and movable along said guide member in said first direction, said device having a projection and said arm having prongs straddling said projection.

15. The apparatus of claim 1, further comprising a housing for said carriage, said housing having a window and said carriage including a portion which extends from said housing through said window, said device being disposed outside of said housing adjacent said portion of said carriage.

16. The apparatus of claim 15, wherein said window receives said portion of said carriage with clearance and further comprising means for sealing said clearance.

17. The apparatus of claim 16, wherein said sealing means comprises bellows.

18. The apparatus of claim 15, wherein said housing includes a wall which is provided with said window, said device including a plate which is at least substantially parallel to said wall.

19. Apparatus for moving an object, such as the gripper of an inserter for workpieces, between two positions in a first direction and in a second direction substantially at right angles to the first direction, comprising first guide means extending in said first direction; a carriage reciprocable along said guide means; second guide means provided on said carriage and extending in said second direction; an object supporting device movable along said second guide means; means for reciprocating said carriage along said first guide means, including a rotor, first cam means provided on said rotor, and means for transmitting motion from said first cam means to said carriage; means for moving said device back and forth along said second guide means, including second cam means provided on said rotor, and means for transmitting motion between said second cam means and said device, including an elongated guide member forming part of said first guide means and being turnable by said second cam means about an axis which extends in said first direction; a plurality of limit switches adjacent said guide member; and means for actuating said limit switches including an arm turnable with said guide member and being movable longitudinally of said guide member in response to turning of said guide member by said second cam means.

20. The apparatus of claim 19, wherein at least one of said limit switches includes a pneumatic valve.

21. The apparatus of claim 1, further comprising means for rotating said rotor, at least one actuator which orbits along a predetermined path about the axis of said rotor when said rotor is driven by said rotating means, and at least one signal generating component adjacent the path of orbital movement of said at least one actuator.

22. The apparatus of claim 21, wherein said component includes a contact-free initiator having means for generating signals to arrest said rotating means.

23. The apparatus of claim 21, wherein said component includes a contact-free initiator having means for generating signals for transmission to the object which is supported by said device.

* * * * *